Dec. 17, 1929.   E. SCHLIEDERER   1,739,614
RUNNING TOY FIGURE
Filed July 9, 1928

Inventor:
Emil Schliederer
By: Marks & Clerk
Attys.

Patented Dec. 17, 1929

1,739,614

UNITED STATES PATENT OFFICE

EMIL SCHLIEDERER, OF NUREMBERG, GERMANY, ASSIGNOR TO THE FIRM BING-WERKE, VORM GEBR. BING A. G., OF NUREMBERG, GERMANY

RUNNING TOY FIGURE

Application filed July 9, 1928, Serial No. 291,421, and in Germany December 20, 1927.

This invention relates to a running animal figure or the like, and is distinguished from known running animal figures, which are either drawn along or driven by a spring mechanism, by the fact that a springless running mechanism driven by a Bowden wire and provided with a flywheel is arranged upon a running axle of the animal figure, preferably between the front legs. The Bowden wire serves according to the invention as a lead, which enters the body of the animal at the collar or at the neck, passes through the body, and enters the casing of the running mechanism from above. This method of guiding the Bowden wire gives rise to the impression that the toy figure is being led by the line and the nature of the drive enables the playing child to let the animal figure run on in front. In order to obtain an advantageous driving mechanism which will be easy to actuate, according to the invention the end of the steel wire of the Bowden cable traversing the body of the animal is connected with a toothed segment swinging to and fro, driving the running axle of the mechanism in one direction.

Figure 1:
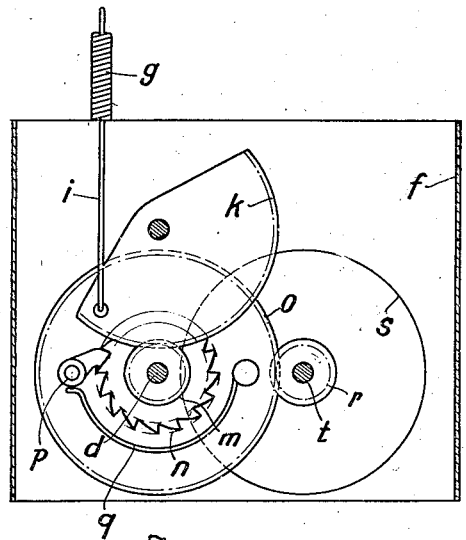
Figure 2:
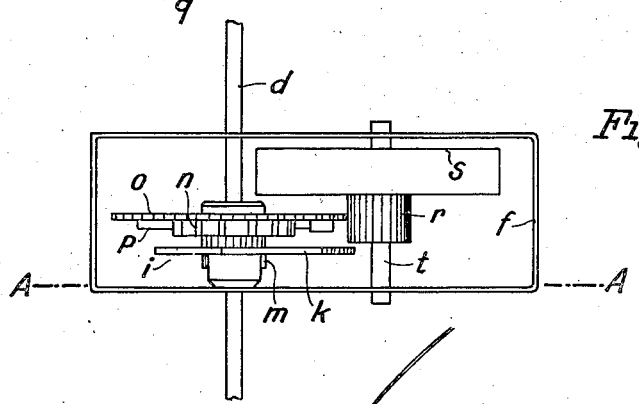
Figure 3:
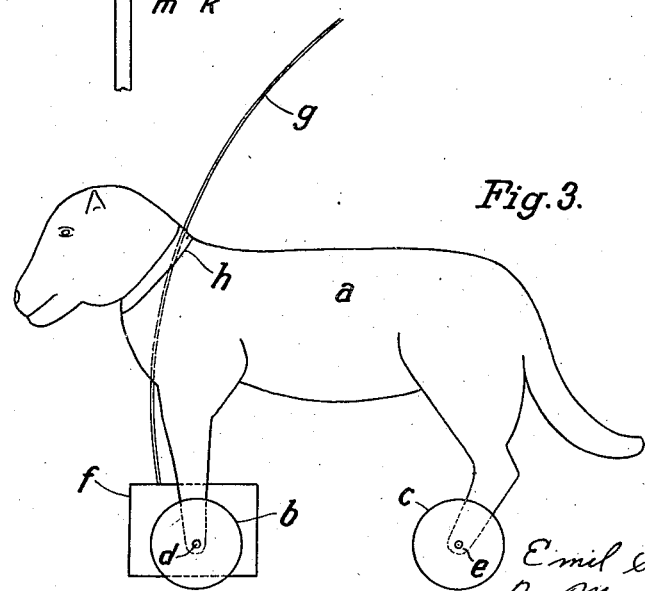

One constructional example of the invention is illustrated in the drawing, wherein Fig. 1 shows a sectional side elevation of the running mechanism on the section line A—A in Fig. 2, Fig. 2 shows a plan of the running mechanism, and Fig. 3 shows a running animal figure with running mechanism fitted therein, and also the Bowden cable.

The animal figure $a$ carries on its legs running axles $d$ and $e$ provided with running wheels $b$ and $c$. Between the front legs is mounted the running mechanism, which is lodged in a casing $f$. A Bowden cable $g$ serves as a driving means and as an apparent leading line. It enters the body of the animal $a$ at the collar $h$ and passes through the body. The sheath of the Bowden cable is secured to the mechanism casing $f$, while the displaceable end $i$ of the steel wire is connected with a toothed segment $k$, the partial revolutions of which are transmitted to a small toothed wheel $m$. The driving of the toothed pinion $m$ by means of a toothed segment $k$ has the advantage over a rack drive, in consequence of the multiple transmission between the toothed segment $k$ and the pinion $m$, that the tensile force in the steel wire $i$ may be smaller, and the Bowden cable therefore easier to operate. The toothed pinion $m$ is rigidly connected with a ratchet wheel $n$ and is mounted loose upon the front running axle $d$, upon which a toothed wheel $o$, which carries a detent $p$, with an applying spring $q$, is mounted fast. This toothed wheel $o$ meshes with a driving wheel $r$, which is rigidly connected with a flywheel $s$ and is mounted upon an axle $t$.

The method of working the running toy figure is as follows:—When the end $i$ of the steel wire of the Bowden cable is moved up and down, the toothed segment $k$ swings to and fro, and, during retraction of the wire $i$, drives the pinion $m$, and, by means of the ratchet wheel $n$ and its pawl $p$, drives the toothed wheel $o$ mounted upon the running axle, the rotation of which is maintained for a fairly long time by the flywheel $s$. If the running toy is to be kept continually in motion a periodic drive must be effected by means of the Bowden cable.

What I claim is:

1. A running toy figure comprising a driving axle, running wheels mounted on the driving axle, mechanism for rotating said running wheels and a Bowden cable connected to the toy figure for communicating power to said mechanism, and serving at the same time as a lead, said mechanism comprising an oscillatably mounted toothed segment adapted to be oscillated by the Bowden cable, a toothed pinion meshing with the toothed segment, a one way ratchet gear and a flywheel operatively connected to said toothed pinion and said running wheels for producing a continuous rotary motion of the running wheels from the toothed segment.

2. A running toy figure, comprising a driving axle, running wheels mounted on the driving axle, mechanism for rotating the driving axle, and a Bowden cable for communicating power to said mechanism, said Bowden cable entering the body of the toy figure in the neighbourhood of the neck, and serving at the same time as a lead, the mechanism comprising an oscillatably mounted toothed segment adapted to be oscillated by the Bowden cable, a toothed pinion meshing with the toothed segment and mounted loose on the driving axle, a toothed wheel mounted fast on the driving axle, ratchet and pawl gearing by which the toothed pinion drives said toothed wheel and the driving axle in one direction only, a rotatable shaft, a flywheel secured to said rotatable shaft, and a toothed wheel secured to said rotatable shaft and meshing with the toothed wheel mounted fast on the driving axle.

Dated this 7th day of May, 1928.

In testimony whereof I have signed my name to this specification.

EMIL SCHLIEDERER.